United States Patent
Truettner et al.

(10) Patent No.: US 11,258,272 B2
(45) Date of Patent: Feb. 22, 2022

(54) TEMPERATURE ESTIMATION AND CONTROL SYSTEMS, METHODS, AND DEVICES FOR A BATTERY PACK CHARGER

(71) Applicant: MILWAUKEE ELECTRIC TOOL CORPORATION, Brookfield, WI (US)

(72) Inventors: Donald J. Truettner, Waukesha, WI (US); Allen Lukowitz, Waukesha, WI (US); Vasil Zhmendak, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 161 days.

(21) Appl. No.: 16/716,562

(22) Filed: Dec. 17, 2019

(65) Prior Publication Data

US 2020/0203969 A1  Jun. 25, 2020

Related U.S. Application Data

(60) Provisional application No. 62/783,409, filed on Dec. 21, 2018.

(51) Int. Cl.
*H02J 7/00* (2006.01)
*H02J 7/06* (2006.01)

(52) U.S. Cl.
CPC ...... *H02J 7/00041* (2020.01); *H02J 7/00309* (2020.01); *H02J 7/06* (2013.01)

(58) Field of Classification Search
USPC ................................................ 320/150–154
See application file for complete search history.

(56) References Cited

U.S. PATENT DOCUMENTS 5,633,574 A  5/1997  Sage
6,157,175 A  12/2000  Morinigo et al.
(Continued)

FOREIGN PATENT DOCUMENTS

CN  202930977 U  5/2013
CN  105846523 A  8/2016
(Continued)

OTHER PUBLICATIONS

International Search Report and Written Opinion for Application No. PCT/US2019/066686 dated Apr. 20, 2020 (8 pages).

*Primary Examiner* — Samuel Berhanu
(74) *Attorney, Agent, or Firm* — Michael Best & Friedrich LLP

(57) ABSTRACT

A battery pack charger includes a first circuit region, a second circuit region, an input voltage measuring circuit, a temperature measurement device, and a controller. The controller is configured to measure an input voltage to the charger using the input voltage measuring circuit, measure a temperature of the second circuit region using the temperature measurement device, and estimate a temperature of the first circuit region based on the input voltage to the charger and the measured temperature of the second circuit region. The controller is further configured to select one of a plurality of correlations between the temperature of the second circuit region and the temperature of the first circuit region based on the input voltage to the charger to estimate the temperature of the first circuit region. After the temperature of the first circuit region has been estimated, one or more control operations associated with the charger can be performed.

20 Claims, 6 Drawing Sheets

(56) References Cited

U.S. PATENT DOCUMENTS

| | | | |
|---|---|---|---|
| 6,265,850 B1 * | 7/2001 | Kimura | H02J 7/0021 320/150 |
| 6,700,214 B2 | 3/2004 | Ulinski et al. | |
| 6,700,802 B2 | 3/2004 | Ulinski et al. | |
| 7,061,209 B2 | 6/2006 | Mori | |
| 7,675,265 B2 | 3/2010 | Mori | |
| 7,932,694 B2 | 4/2011 | Watanabe et al. | |
| 8,581,547 B2 | 11/2013 | Hoff | |
| 9,252,463 B2 | 2/2016 | Yang et al. | |
| 9,819,204 B2 | 11/2017 | Miller et al. | |
| 10,012,703 B2 | 7/2018 | Gilbert et al. | |
| 10,075,000 B2 | 9/2018 | Miller et al. | |
| 2007/0247105 A1 | 10/2007 | Krieger et al. | |
| 2012/0056591 A1 * | 3/2012 | Abe | H01M 10/48 320/132 |
| 2012/0281433 A1 | 11/2012 | Yamanaka | |
| 2013/0200845 A1 * | 8/2013 | Bito | H02J 7/0042 320/109 |
| 2015/0137741 A1 * | 5/2015 | Gurries | H02J 7/0077 320/107 |
| 2016/0197500 A1 | 7/2016 | Liang | |
| 2017/0012448 A1 | 1/2017 | Miller et al. | |
| 2017/0288435 A1 | 10/2017 | Miller et al. | |
| 2018/0048168 A1 | 2/2018 | Miller et al. | |
| 2018/0233934 A1 | 8/2018 | Miller et al. | |
| 2019/0189042 A1 * | 6/2019 | Aurongzeb | G06F 1/1637 |

FOREIGN PATENT DOCUMENTS

| | | |
|---|---|---|
| CN | 105846528 A | 8/2016 |
| JP | 1995065870 A | 3/1995 |
| JP | H765870 A | 3/1995 |
| JP | 2014220931 A | 11/2014 |
| JP | 2018025427 A | 2/2018 |
| KR | 101000561 B1 | 12/2010 |
| TW | 200306695 A | 11/2003 |
| TW | 200413743 A | 8/2004 |
| WO | 200046897 A1 | 8/2000 |

* cited by examiner

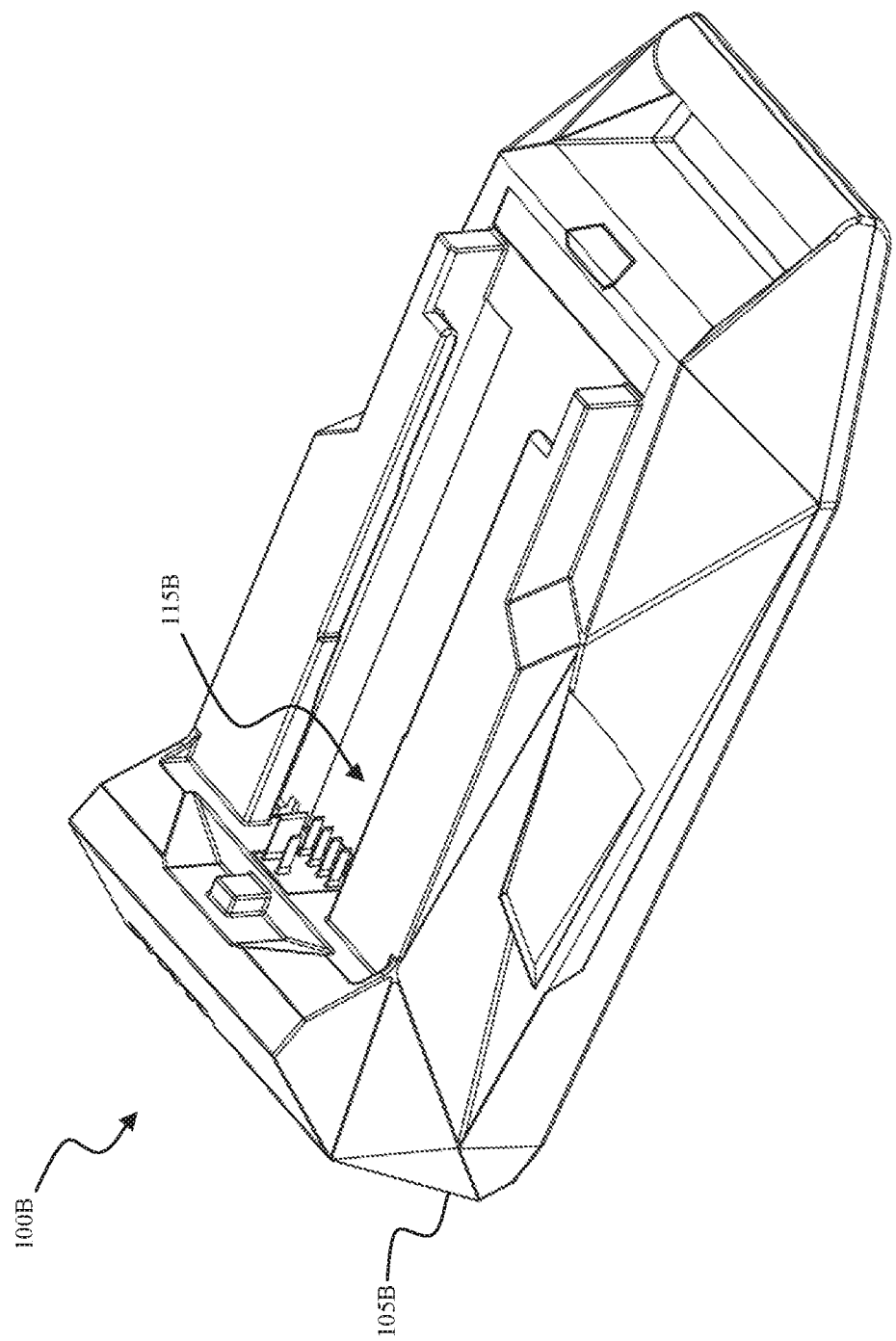

TEMPERATURE ESTIMATION AND CONTROL SYSTEMS, METHODS, AND DEVICES FOR A BATTERY PACK CHARGER

RELATED APPLICATIONS

This application claims the benefit of U.S. Provisional Patent Application No. 62/783,409, filed Dec. 21, 2018, the entire content of which is hereby incorporated by reference.

FIELD

Embodiments described herein provide a battery pack charger.

SUMMARY

A battery pack charger for charging one or more battery packs includes a first circuit region for alternating current ("AC") electrical or electronic components and a second circuit region for direct current ("DC") electrical or electronic components. The first circuit region and the second circuit region are separate or separated from one another within a housing of the battery pack charger. The first circuit region includes a first heat sink or a first portion of a heat sink. The second circuit region includes a second heat sink or a second portion of a heat sink. The first heat sink or first portion of a heat sink is operable to dissipate heat from AC electrical or electronic components in the first circuit region. The second heat sink or second portion of a heat sink is operable to dissipate heat from DC electrical or electronic components in the second circuit region.

The hottest portion of the battery pack charger can be the first circuit region, which includes the AC electrical or electronic components. However, the temperature of the first circuit region is not directly measured (e.g., using a thermistor). Rather, a temperature measurement device (e.g., a thermistor) is included in the second circuit region, which includes the DC electrical or electronic components. A controller within the battery pack charger measures a temperature of the second circuit region using the temperature measurement device. The controller then estimates a temperature of the first circuit region based on the temperature measured in relation to the second circuit region. However, the temperature estimated for the first circuit region can be affected by the input voltage to the first circuit region (i.e., AC input line voltage). Previously, battery pack chargers assumed that an AC input line voltage was 120V AC, which results in an incorrect temperature estimation if the AC input line voltage has a value other than 120V AC. To compensate for variations in the input voltage to the battery pack charger, the controller determines the estimated temperature of the first circuit region based on the input voltage to the battery pack charger.

For example, a minimum input line voltage for the battery pack charger is approximately 85V AC. An expected input operating voltage for the battery pack charger is approximately 120V AC. The difference between the 120V AC input line voltage and the 85V AC input line voltage can significantly affect the temperature of the first circuit region of the battery pack charger. To account or compensate for these variations in input line voltage, the controller estimates the temperature of the first circuit region based on both a measured temperature (e.g., using a thermistor) of the second circuit region and an AC input line voltage.

Battery pack chargers described herein include a first circuit region, a second circuit region, an input voltage measuring circuit, a temperature measurement device, and a controller. The controller is configured to measure an input voltage to the battery pack charger using the input voltage measuring circuit, measure a temperature of the second circuit region using the temperature measurement device, and estimate a temperature of the first circuit region based on the input voltage to the battery pack charger and the measured temperature of the second circuit region. The controller is further configured to select one of a plurality of relationships or correlations between the temperature of the second circuit region and the temperature of the first circuit region based on the input voltage to the battery pack charger to estimate the temperature of the first circuit region. After the temperature of the first circuit region has been estimated, one or more control operations associated with the battery pack charger can be performed (e.g., controlling a fan, turning off the charger, etc.).

Battery pack chargers described herein include a first circuit region, a second circuit region, an input voltage measuring circuit, a temperature measurement device, and a controller. The controller is configured to measure an input voltage to the battery pack charger using the input voltage measuring circuit, measure a temperature of the second circuit region using the temperature measurement device, estimate a temperature of the first circuit region based on the input voltage to the battery pack charger and the measured temperature of the second circuit region, and perform a control operation associated with the battery pack charger based on the estimated temperature of the first circuit region.

Methods described herein provide for controlling an operation of a battery pack charger. The methods include measuring an input voltage to the battery pack charger using an input voltage measuring circuit, measuring a temperature of a second circuit region using a temperature measurement device, estimating a temperature of a first circuit region based on the input voltage to the battery pack charger and the measured temperature of the second circuit region, and controlling the operation of the battery pack charger based on the estimated temperature of the first circuit region.

Charging circuits described herein include a first circuit region and a second circuit region. The first circuit region includes an isolation power supply and a power input circuit. The power input circuit is configured receive a voltage from the isolation power supply and generate a direct current voltage signal. The second circuit region includes a temperature measurement component and a control circuit. The temperature measurement component is configured to generate a signal related to a temperature of the second circuit region. The control circuit is configured to receive the direct current voltage signal, receive the signal related to the temperature of the second circuit region, estimate a temperature of the first circuit region based on the direct current voltage signal and the signal related to the temperature of the second circuit region, and control an operation associated with the battery pack charger based on the estimated temperature of the first circuit region.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIG. 1B is a perspective view of a battery pack charger according to embodiments described herein.

DETAILED DESCRIPTION

Embodiments described herein provide systems, methods, and devices for estimating a temperature within a battery pack charger and controlling the battery pack charger based on the estimated temperature. The battery pack charger includes a first or AC circuit region and a second or DC circuit region. A controller of the battery pack charger is configured to measure an input voltage to the battery pack charger using a power input circuit, measure a temperature of the second circuit region using a thermistor, and estimate a temperature of the first circuit region based on the input voltage to the battery pack charger and the measured temperature of the second circuit region. The controller estimates the temperature of the first circuit region by selecting one of a plurality of relationships or correlations between the temperature of the second circuit region and the temperature of the first circuit region. The controller selects one of the plurality of relationships or correlations based on the measured input voltage to the battery pack charger. After the controller estimates the temperature of the first circuit region, the controller is configured to perform one or more control operations associated with the battery pack charger, such as, for example, controlling a fan, turning off the battery pack charger, etc. By performing the one or more control operations, the controller is able to maintain proper operating temperatures for the battery pack charger (i.e., operating temperatures between an established low-temperature threshold [e.g., 40° F.] and an established high-temperature threshold [e.g., 105° F.]).

Figure 1A:
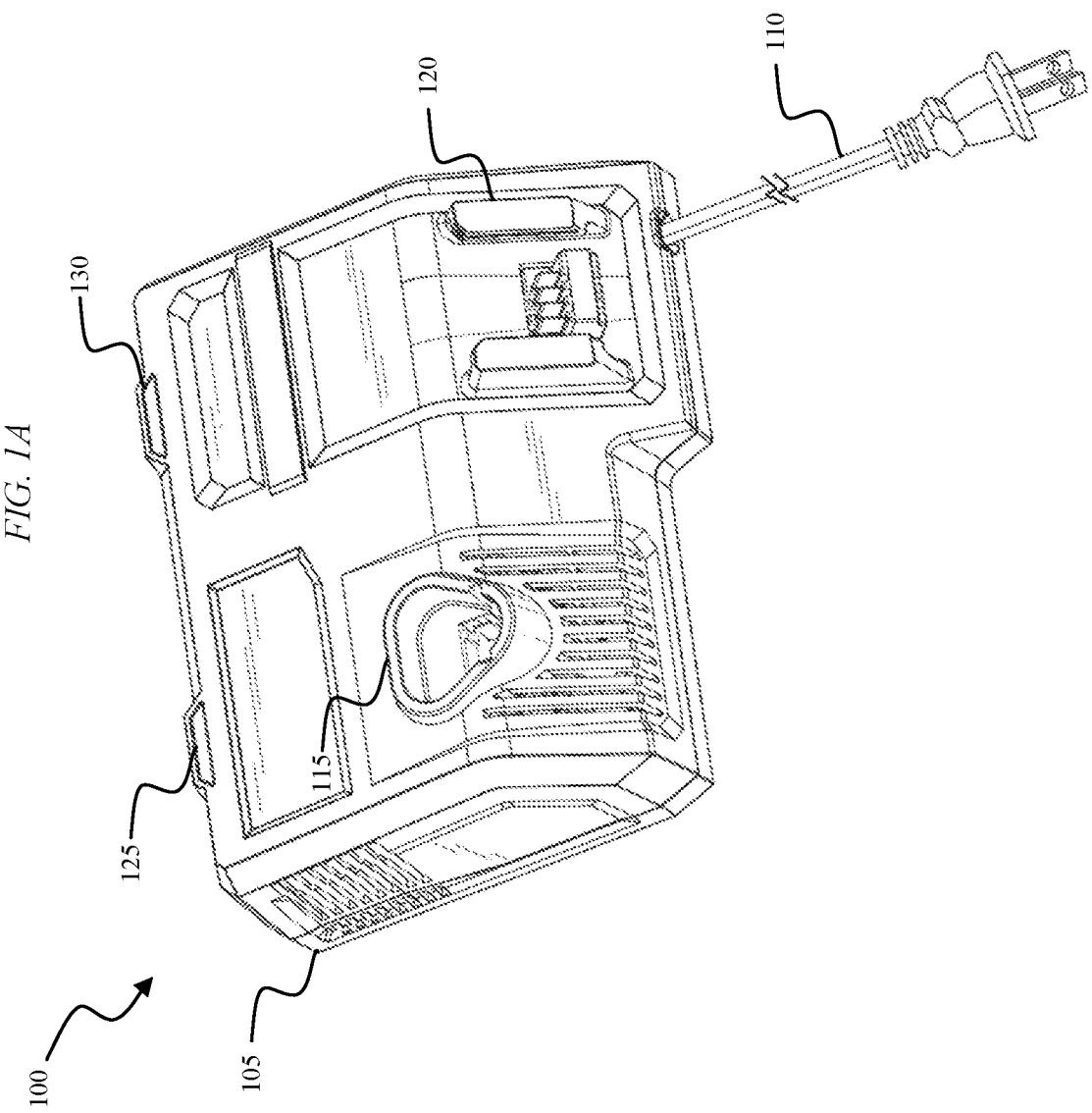
FIG. 1A is a perspective view of a battery pack charger according to embodiments described herein.

FIG. 1A illustrates a battery pack charger or charger 100. The battery pack charger 100 includes a housing portion 105 and an AC input power plug 110. The battery pack charger 100 can be configured to charge one or more battery packs having one or more nominal voltage values. For example, the battery pack charger 100 illustrated in FIG. 1 is configured to charge a first type of battery pack using a first battery pack receiving portion or interface 115 and a second type of battery pack using a second battery pack receiving portion or interface 120. The first type of battery pack is, for example, a 12V battery pack having a stem that is inserted into the first battery pack receiving portion 115. The second type of battery pack is, for example, an 18V battery pack having a plurality of rails for slidably attaching the battery pack in the second battery pack receiving portion 120.

FIG. 1B illustrates a battery pack charger or charger 100B. The battery pack charger 100 includes a housing portion 105. The battery pack charger 100B can be configured to charge battery packs having one or more nominal voltage values. For example, the battery pack charger 100B illustrated in FIG. 1B is configured to charge a battery pack using a battery pack receiving portion or interface 115B. The battery pack is, for example, an 80V battery pack having a plurality of rails for slidably attaching the battery pack in the battery pack receiving portion 115B.

The battery packs can each include a plurality of lithium-based battery cells having a chemistry of, for example, lithium-cobalt ("Li—Co"), lithium-manganese ("Li—Mn"), or Li—Mn spinel. In some embodiments, the battery cells have other suitable lithium or lithium-based chemistries, such as a lithium-based chemistry that includes manganese, etc. The battery cells within each battery pack are operable to provide power (e.g., voltage and current) to one or more power tools.

Figure 2:
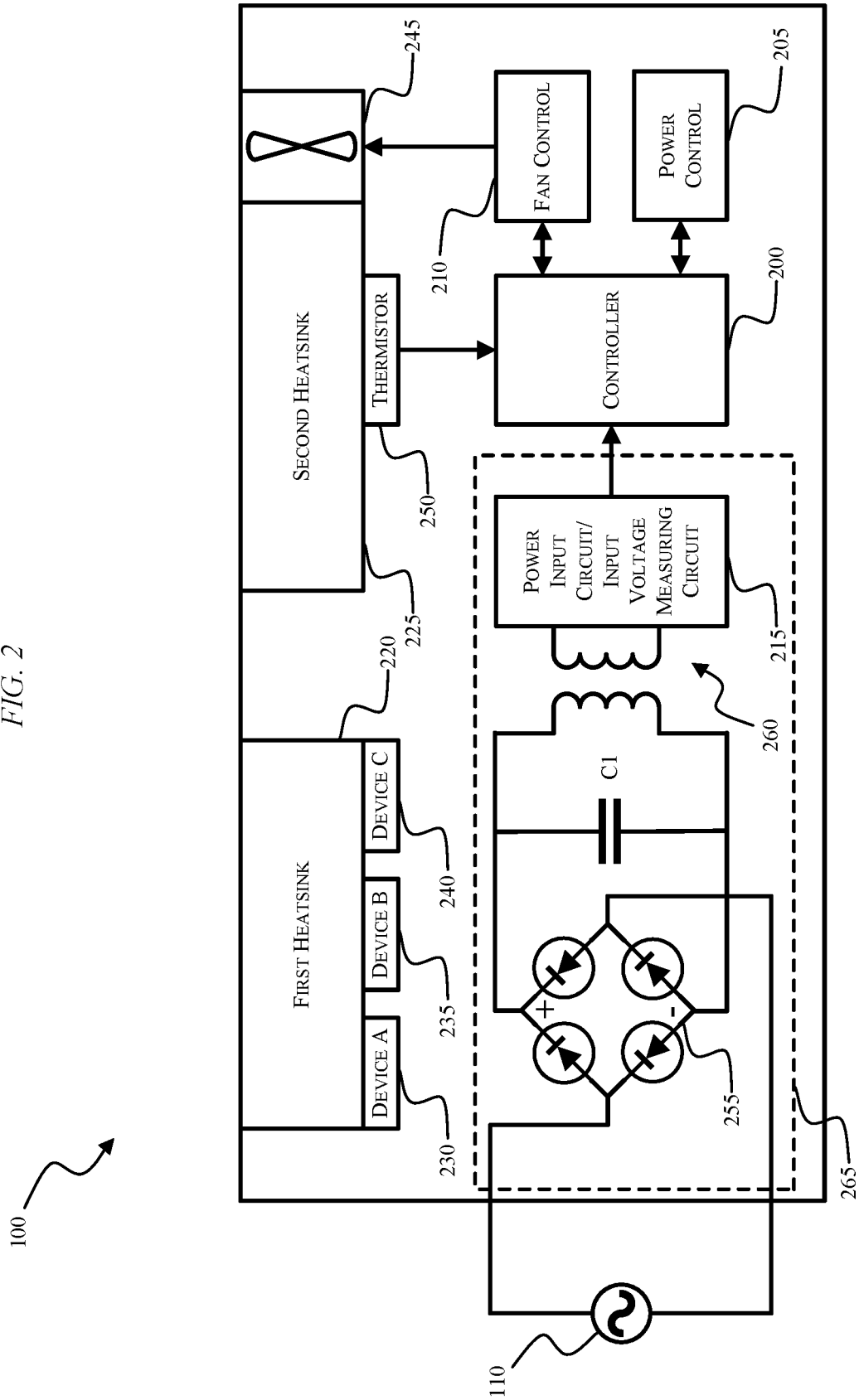
FIG. 2 is an electromechanical diagram of the battery pack charger of FIG. 1 according to embodiments described herein.

FIG. 2 is an electromechanical diagram of the battery pack charger 100 or 100B. For illustrative purposes, the electromechanical diagram will be described with respect to battery pack charger 100. FIG. 2 illustrates input power electronics and a controller or control circuit 200 for controlling the operation of the battery pack charger 100. In addition to the controller 200, the battery pack charger 100 also includes a power control module 205, a fan control module 210, a power input or input voltage measuring circuit module 215, a first heatsink 220, and a second heatsink 225 (e.g., a heatsink for a power semiconductor). In some embodiments, the first heatsink 220 and the second heatsink 225 are combined into a single heatsink that is partially used to dissipate heat generated by DC components and partially used to dissipate heat generated by AC components. Associated or in thermal communication with the first heatsink 220 are a first electrical or electronic component 230, a second electrical or electronic component 235, and a third electrical or electronic component 240. The first, second, and third components 230, 235, and 240 can be, for example, switches, diodes, resistors, or another component associated with the first heat sink 220 that generates heat to be dissipated by the first heatsink 220. In other embodiments, additional or fewer electrical or electronic components can be associated with or in thermal communication with the first heatsink 220, and three such components are merely provided for illustrative purposes.

The charger 100 also includes a fan 245, a thermistor 250, a diode bridge 255, and an isolation power supply or isolation transformer 260. The diode bridge 255 and isolation power supply or isolation transformer 260 combine with, for example, a capacitor C1, and the power input circuit module 215 to form a power converter 265. The power converter 265, first component 230, second component 235, third component 240, and first heatsink 220 can be referred to generally as a first or AC circuit region. The controller 200, power control module 205, fan control module 210, second heatsink 225, thermistor 250, and fan 245 can be referred to generally as a second or DC circuit region. The power converter 265 takes an AC input line voltage from the AC input power plug 110 and converts the AC input line voltage to one or more safe, isolated DC voltages that can be used to power components within the battery pack charger 100.

For example, the AC input line voltage (assumed to be approximately sinusoidal) enters the power converter 265 and is rectified by the diode bridge 255 and filtered by the capacitor C1 to produce a DC bus voltage. The DC bus voltage has a value equal to the root-mean-square ("RMS") line voltage multiplied by the square root of two, as shown below in EQN. 1:

$$V_{DC} = V_{RMS} * \sqrt{2} \qquad \text{EQN. 1}$$

The DC voltage, $V_{DC}$, is then used by the isolation power supply 260 to produce the one or more safe, isolated DC voltages that can be used to power electrical components within the battery pack charger 100. The isolation power supply 260 includes a transformer having a primary winding and a secondary winding. The voltage on the secondary winding of the transformer represents the magnitude of the voltage on the primary winding of the transformer, but is scaled by the turns ratio of the transformer, as shown below in EQN. 2:

$$V_{SEC} = V_{PRI} * \left(\frac{N_S}{N_P}\right) \qquad \text{EQN. 2}$$

where $N_S$ is the number of turns in the secondary winding of the transformer, $N_P$ is the number of turns in the primary winding of the transformer, $V_{PRI}$ is the voltage of the primary winding, and $V_{SEC}$ is the voltage of the secondary winding. The relationship of EQN. 2 enables an isolated line voltage measurement to be made by the controller 200 on a user-side of the charger electronics (i.e., the DC circuit region).

The output voltage of the isolation power supply 260 or the power converter 265 can be provided to the controller 200 and used to power, among other things, the power control module 205, the fan control module 210, and the fan 245. The power control module 205 is configured to control charging power provided to the first battery pack receiving portion 115 and the second battery pack receiving portion 120 to charge one or more battery packs. The fan control module 210 is electrically connected to the fan 245 for providing operational power and control to the fan 245.

Figure 3:
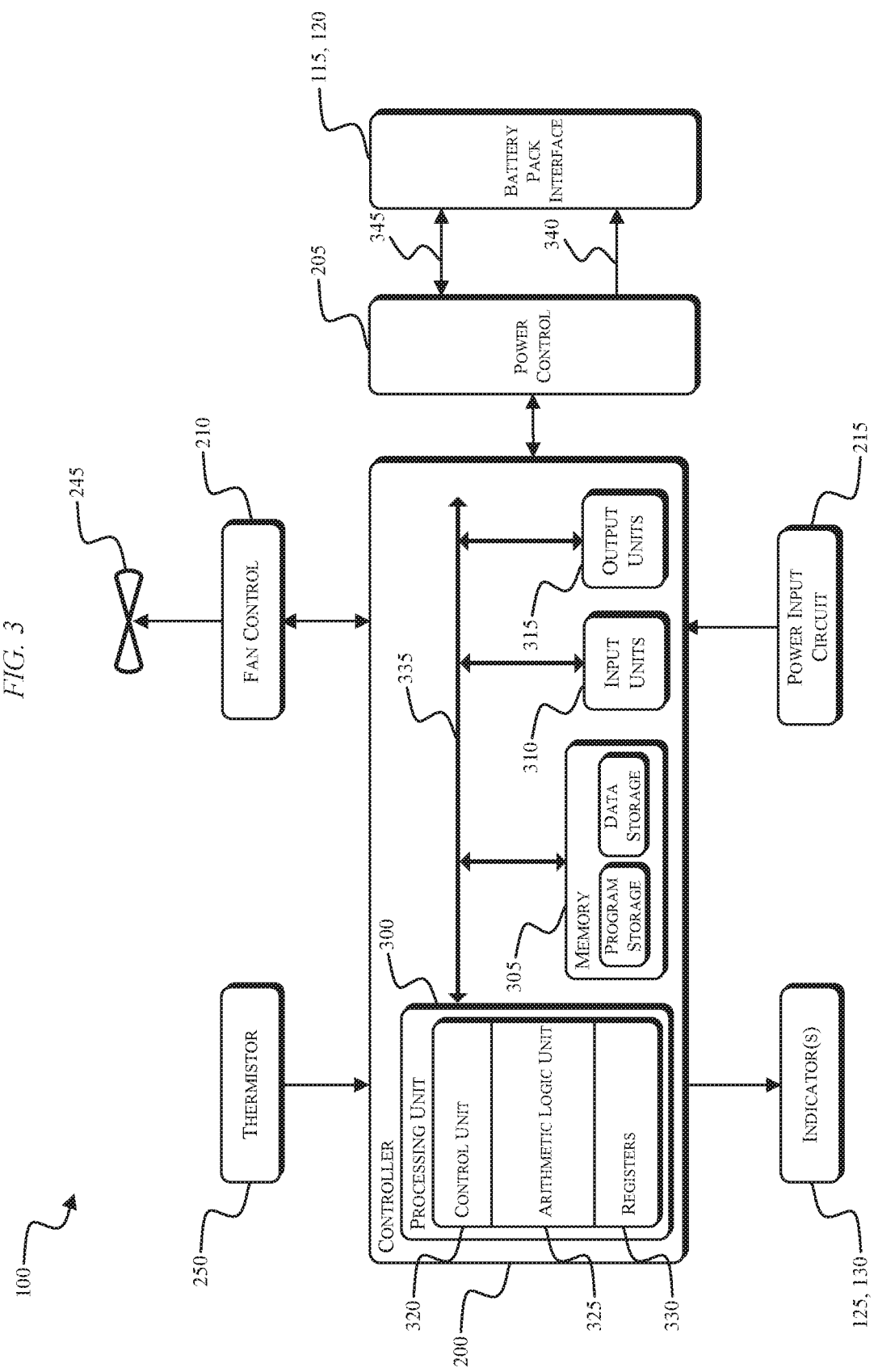
FIG. 3 is an electromechanical diagram of a controller for the battery pack charger of FIG. 1 according to embodiments described herein.

The controller 200 is illustrated in greater detail with respect to FIG. 3. The controller 200 is electrically and/or communicatively connected to a variety of modules or components of the battery pack charger 100. For example, the illustrated controller 200 is connected to the first and second battery pack portions or interfaces 115, 120 through the power control module 205, the indicators 125, 130, the fan control module 210, the power input circuit 215, and the thermistor 250. The controller 200 includes combinations of hardware and software that are operable to, among other things, control the operation of the battery pack charger 100, activate the indicators 125, 130 (e.g., one or more LEDs), estimate the temperature of the first heatsink 220, measure the temperature of the second heatsink 225, etc.

In some embodiments, the controller 200 includes a plurality of electrical and electronic components that provide power, operational control, and protection to the components and modules within the controller 200 and/or battery pack charger 100. For example, the controller 200 includes, among other things, a processing unit 300 (e.g., an electronic processor, a microprocessor, a microcontroller, or another suitable programmable device), a memory 305, input units 310, and output units 315. The processing unit 300 includes, among other things, a control unit 320, an ALU 325, and a plurality of registers 330 (shown as a group of registers in FIG. 3), and is implemented using a known computer architecture (e.g., a modified Harvard architecture, a von Neumann architecture, etc.). The processing unit 300, the memory 305, the input units 310, and the output units 315, as well as the various modules connected to the controller 200 are connected by one or more control and/or data buses (e.g., common bus 335). The control and/or data buses are shown generally in FIG. 3 for illustrative purposes. The use of one or more control and/or data buses for the interconnection between and communication among the various modules and components would be known to a person skilled in the art in view of the invention described herein.

The memory 305 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 300 is connected to the memory 305 and executes software instructions that are capable of being stored in a RAM of the memory 305 (e.g., during execution), a ROM of the memory 305 (e.g., on a generally permanent basis), or another non-transitory computer readable medium such as another memory or a disc. Software included in the implementation of the battery pack charger 100 can be stored in the memory 305 of the controller 200. The software includes, for example, firmware, one or more applications, program data, filters, rules, one or more program modules, and other executable instructions. The controller 200 is configured to retrieve from the memory 305 and execute, among other things, instructions related to the control processes and methods described herein. In other constructions, the controller 200 includes additional, fewer, or different components.

The battery pack interface 115, 120 includes a combination of mechanical components and electrical components configured to and operable for interfacing (e.g., mechanically, electrically, and communicatively connecting) the battery pack charger 100 with a battery pack. For example, the battery pack interface 115, 120 is configured to receive power from the power control module 205 via a power line 340 between the power control module 205 and the battery pack interface 115, 120. The battery pack interface 115, 120 is also configured to communicatively connect to the power control module 205 via a communications line 345.

The controller 200 measures a temperature associated with the DC circuit region and second heatsink 225 using the thermistor 250, which is proportional to the output of the power converter 265. Based on the measured temperature of the DC circuit region, the controller 200 estimates a temperature of the AC circuit region and first heatsink 220. The thermal relationships or gradients between the temperature measured by the thermistor 250 and other components of the battery pack charger 100 can be stored in the memory 305 of the controller 200. As a result, the temperature measured by the thermistor 250 can be used as an observer to estimate the temperature of other components of the battery pack charger 100. For example, losses from an input section of the power converter 265 are generally inversely proportional to the input voltage of the power converter 265. Without knowing the actual input voltage to the power converter 265, the thermal relationship between the temperature measured by the thermistor 250 and the power converter 265 (i.e., the AC circuit region) may be invalid. By determining the input voltage of the power converter 265 (i.e., the AC input line voltage to the battery pack charger 100), the controller 200 can select an appropriate thermal relationship between the temperature measured by the thermistor 250 and the power converter 265 for determining the temperature of the AC circuit region and first heatsink 220.

After determining the temperature of the AC circuit region and the first heatsink 220, the controller 200 provides information and/or control signals to the fan control module 210 for driving the fan 245. Driving the fan 245 includes turning the fan 245 ON, turning the fan 245 OFF, increasing the rotational speed of the fan 245, decreasing the rotational speed of the fan, etc. The fan 245 is driven to maintain a desirable operating condition for the battery pack charger 100. In some embodiments, the fan 245 is operated to maintain the temperature (e.g., internal ambient temperature) of the battery pack charger 100 within a desired range of temperatures (e.g., 40° F. to 105° F.). In other embodiments, the fan 245 is operated to maintain the temperature (e.g., internal ambient temperature) of the battery pack charger 100 at a particular temperature (e.g., 85° F.).

Figure 4:
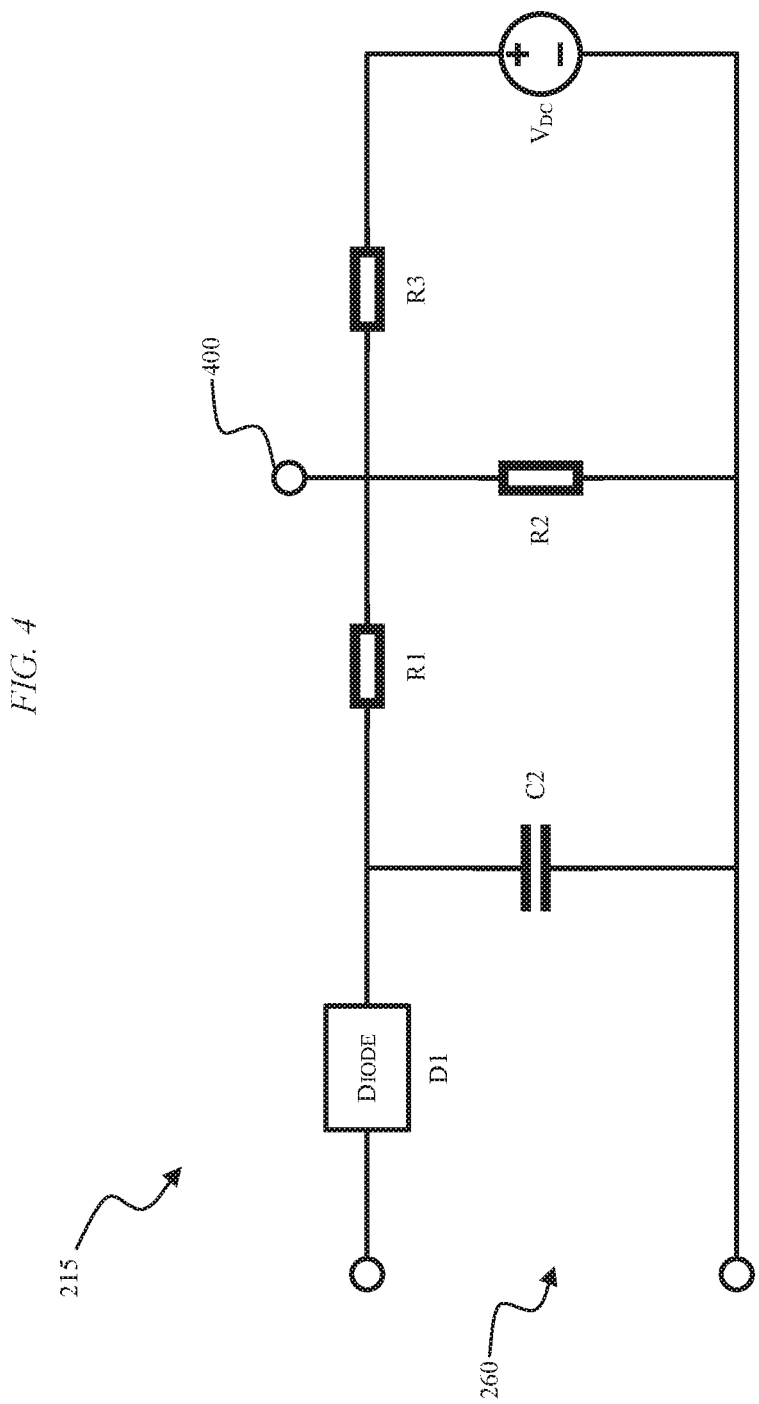
FIG. 4 is an electrical schematic diagram of a power input circuit for the battery pack charger of FIG. 1 according to embodiments described herein.

FIG. 4 illustrates the power input circuit 215 for translating a voltage from the secondary winding of the isolation power supply 260 to a DC voltage signal that can be used by the controller 200 to estimate the temperature of the AC circuit region and the first heatsink 220. In some embodiments, the power input circuit 215 is parallel to and tapped from the output of the secondary winding of the isolation power supply 260. As a result, the power input circuit 215 can be used for determining AC input line voltage while a main output from the isolation power supply 260 can be used to provide higher voltages (e.g., 15V DC) for powering other components of the battery pack charger 100. The power input circuit 215 includes a diode D1 for rectifying an AC voltage from the secondary winding of the isolation power supply 260 to a DC voltage. The power input circuit 215 also includes a filter capacitor C2, an input resistor R1, a lower resistor R2, a bias resistor R3, and a DC reference voltage $V_{DC}$.

The diode D1 is connected to the secondary winding of the isolation power supply 260. In some embodiments, the anode of the diode D1 is connected to the secondary winding of the isolation power supply 260. In other embodiments, the cathode of the diode D1 is connected to the secondary winding of the isolation power supply 260. Depending on the configuration of the diode D1, the positive or negative peak of the secondary winding's voltage is captured. The output of the diode D1 is impressed upon the filter capacitor C2. The filter capacitor C2 preserves the peak voltage of the secondary winding by filtering and smoothing the output of the diode D1. The filtered voltage is then scaled down by a voltage divider circuit formed by the input resistor R1 and the lower resistor R2. The bias resistor R3 is used to provide a DC bias voltage, $V_{DC}$, that is added to or subtracted from the node 400 formed by the intersection of input resistor R1, lower resistor R2, and bias resistor R3. The net voltage present at the node 400 formed by the intersection of input resistor R1, lower resistor R2, and bias resistor R3 is then represented as a DC voltage value of between 0V DC and 3V DC. The voltage at the node 400 is provided to the controller 200 as a representation of the magnitude of the AC input line voltage to the battery pack charger 100. The controller 200 is configured to translate the voltage received from the node 400 back into a value for the AC input line voltage. For example, in some embodiments, the controller can use a lookup table stored in the memory 305 that correlates the voltage of the node 400 to an AC input line voltage. In other embodiments, the controller 200 uses values for the resistors R1, R2, and R3, a value for the reference voltage, $V_{DC}$, and EQNS. 1 and 2 to calculate a value for the AC input line voltage. In some embodiments, the controller 200 does not determine an actual value for the AC input line voltage. Rather, the value of the voltage tapped at node 400 is used by the controller 200 to select an appropriate thermal relationship or correlation.

Figure 5:
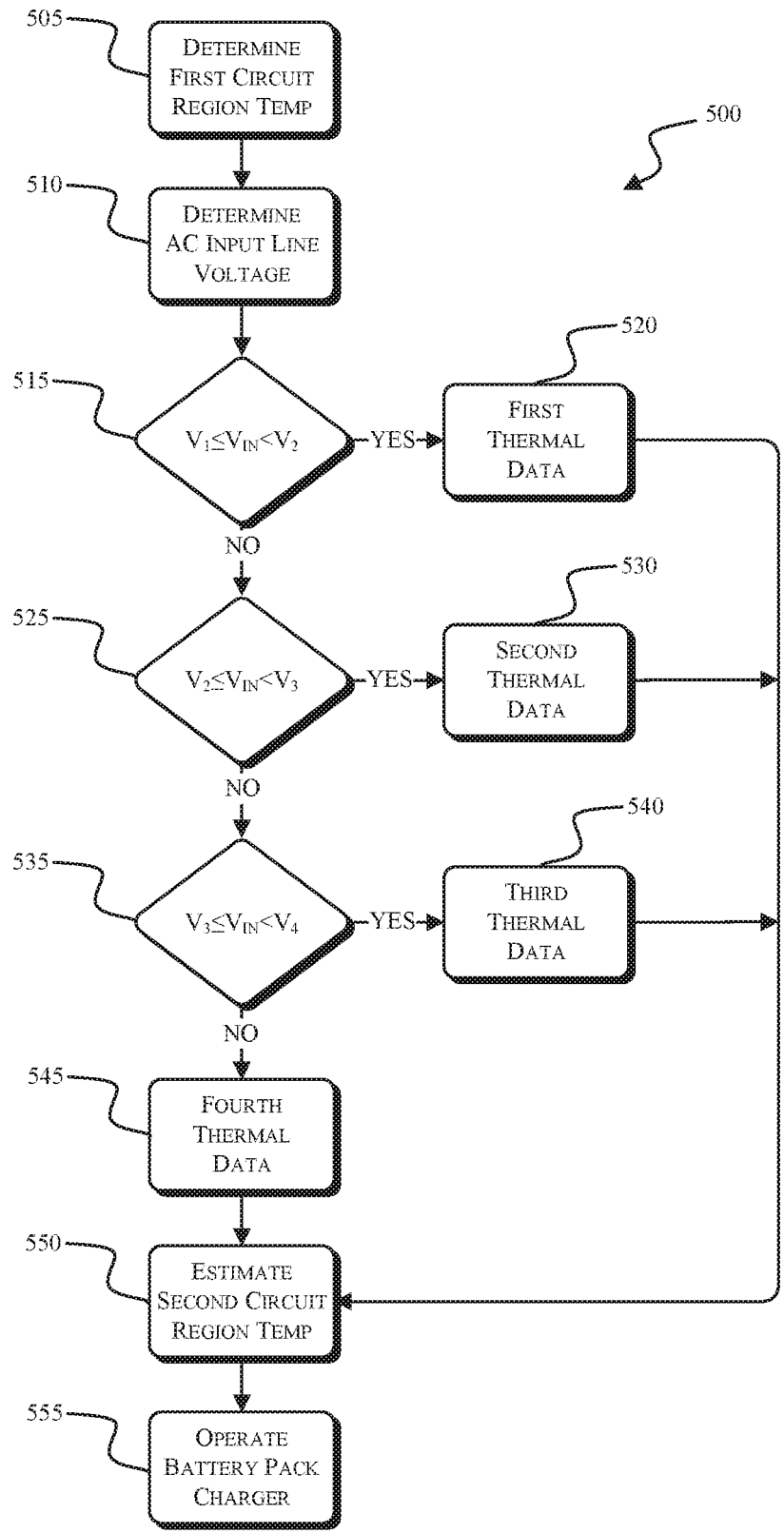
FIG. 5 is a temperature estimation and control process for the battery pack charger of FIG. 1 according to embodiments described herein.

FIG. 5 is a process 500 related to the estimation of the temperature of the AC circuit region and first heatsink 220 based on a measured temperature associated with the DC circuit region and second heatsink 225, and an AC input line voltage to the battery pack charger 100. At STEP 505, the controller 200 determines a temperature for a first circuit region (e.g., DC circuit region and second heatsink 225) based on an output signal from a temperature sensor, such as the thermistor 250. After the controller 200 determines the temperature of the first circuit region, the controller 200 determines an AC input line voltage to the battery pack charger 100 (STEP 510). As described above with respect to FIG. 4, the controller 200 can determine the AC input line voltage based on the value of the voltage tapped at node 400 of the power input circuit 215. For example, the voltage at node 400 has a value of between 0V DC and 3V DC. Based on the value of the voltage tapped at node 400, the controller 200 calculates or looks up (e.g., using a lookup table stored in the memory 305) a corresponding value for the AC input line voltage. In some embodiments, the controller 200 does not determine an actual value for the AC input line voltage. Rather, the value of the voltage tapped at node 400 is used by the controller to select an appropriate thermal relationship or correlation. Whether the controller 200 determines an actual value for the AC input line voltage or uses the value of the voltage tapped at the node 400, the voltage value used by the controller 200 to select a thermal relationship or correlation between the first circuit region and the second circuit region can be referred to as an input voltage value, $V_{IN}$.

At STEP 515, the input voltage to the battery pack charger 100, $V_{IN}$, is compared to a first voltage value, $V_1$, and a second voltage value, $V_2$. If the input voltage, $V_{IN}$, to the battery pack charger 100 is greater than or equal to the first voltage value, $V_1$, and less than the second voltage value, $V_2$, the controller 200 selects a first thermal relationship or correlation between the first circuit region and the second circuit region (STEP 520). The first thermal relationship or correlation corresponds to a first set of thermal data than can be stored in the memory 305 of the controller 200. For example, the thermal relationship or correlation between the first circuit region and the second circuit region is a scalar value that is proportional to the input voltage, $V_{IN}$. The determined temperature of the first circuit region can be multiplied by the scalar value to estimate the temperature of the second circuit region. When the input voltage, $V_{IN}$, has a lower value, the estimated temperature of the second circuit region can have a proportionally lower value. As the input voltage, $V_{IN}$, increases, the estimated temperature of the second circuit region can also increase.

With reference again to FIG. 5 and STEP 515, if the input voltage, $V_{IN}$, is greater than or equal to the second voltage value, $V_2$, the controller 200 compares the input voltage, $V_{IN}$, to the second voltage value, $V_2$, and a third voltage value, $V_3$ (STEP 525). If the input voltage, $V_{IN}$, to the battery pack charger 100 is greater than or equal to the second voltage value, $V_2$, and less than the third voltage value, $V_3$, the controller 200 selects a second thermal relationship or correlation between the first circuit region and the second circuit region (STEP 530). The second thermal relationship or correlation corresponds to a second set of thermal data than can be stored in the memory 305 of the controller 200.

If, at STEP 525, the input voltage, $V_{IN}$, is greater than or equal to the third voltage value, $V_3$, the controller 200 compares the input voltage, $V_{IN}$, to the third voltage value, $V_3$, and a fourth voltage value, $V_4$ (STEP 535). If the input voltage, $V_{IN}$, to the battery pack charger 100 is greater than or equal to the third voltage value, $V_3$, and less than the fourth voltage value, $V_4$, the controller 200 selects a third thermal relationship or correlation between the first circuit region and the second circuit region (STEP 540). The third thermal relationship or correlation corresponds to a third set of thermal data than can be stored in the memory 305 of the controller 200. If, at STEP 535, the input voltage, $V_{IN}$, is greater than or equal to the fourth voltage value, $V_4$, the controller 200 selects a fourth thermal relationship or correlation between the first circuit region and the second circuit region (STEP 545). The fourth thermal relationship or correlation corresponds to a fourth set of thermal data than can be stored in the memory 305 of the controller 200.

After a set of thermal data has been selected by the controller 200 at one of STEPS 520, 530, 540, or 545, the controller 200 uses the selected set of thermal data to estimate the temperature of the second circuit region (e.g., the AC circuit region) (STEP 550). After the controller 200 has estimated the temperature of the second circuit region, the controller 200 operates the battery pack charger 100 based on the estimated temperature of the second circuit region (STEP 555). For example, the controller 200 can perform one or more control operations for the battery pack charger 100 that include turning the battery pack charger 100 OFF, turning the fan 245 ON, turning the fan 245 OFF, increasing the rotational speed of the fan 245, decreasing the rotational speed of the fan, etc. By performing the one or more control operations, the controller 200 is able to maintain proper operating temperatures for the battery pack charger 100 (i.e., operating temperatures between an established low-temperature threshold [e.g., 40° F.] and an established high-temperature threshold [e.g., 105° F.]). In some embodiments, operating the battery pack charger 100 includes activating the indicators 125, 130 to indicate a temperature fault condition of the battery pack charger 100 (e.g., flashing the indicators 125, 130).

Thus, embodiments described herein provide, among other things, a battery charger that includes a controller for estimating the temperature of an AC circuit portion based on a measured AC input line voltage and a measured temperature of a DC circuit portion. Various features and advantages are set forth in the following claims.

What is claimed is:

1. A battery pack charger comprising:
a first circuit region;
a second circuit region;
an input voltage measuring circuit;
a temperature measurement device; and
a controller is configured to:
measure an input voltage to the battery pack charger using the input voltage measuring circuit,
measure a temperature of the second circuit region using the temperature measurement device,
estimate a temperature of the first circuit region based on the input voltage to the battery pack charger and the measured temperature of the second circuit region, and
perform a control operation associated with the battery pack charger based on the estimated temperature of the first circuit region.

2. The battery pack charger of claim 1, further comprising a fan.

3. The battery pack charger of claim 2, wherein the control operation includes controlling the fan.

4. The battery pack charger of claim 1, wherein the controller is further configured to:
select one of a plurality of relationships between the temperature of the second circuit region and the temperature of the first circuit region based on the input voltage to the battery pack charger to estimate the temperature of the first circuit region.

5. The battery pack charger of claim 4, wherein the controller is further configured to:
select a first of the plurality of relationships between the temperature of the second circuit region and the temperature of the first circuit region when the input voltage to the battery pack charger is less than a first voltage value.

6. The battery pack charger of claim 5, wherein the first of the plurality of relationships is a scalar value that is proportional to the input voltage.

7. The battery pack charger of claim 6, wherein the controller is further configured to:
select a second of the plurality of relationships between the temperature of the second circuit region and the temperature of the first circuit region when the input voltage to the battery pack charger is greater than or equal to the first voltage value.

8. A method of controlling an operation of a battery pack charger, the method comprising:
measuring an input voltage to the battery pack charger using an input voltage measuring circuit;
measuring a temperature of a second circuit region using a temperature measurement device;
estimating a temperature of a first circuit region based on the input voltage to the battery pack charger and the measured temperature of the second circuit region; and
controlling the operation of the battery pack charger based on the estimated temperature of the first circuit region.

9. The method of claim 8, wherein controlling the operation of the battery pack charger includes controlling a fan.

10. The method of claim 9, wherein controlling the fan includes increasing a rotational speed of the fan or decreasing the rotational speed of the fan.

11. The method of claim 8, further comprising:
selecting one of a plurality of relationships between the temperature of the second circuit region and the temperature of the first circuit region based on the input voltage to the battery pack charger to estimate the temperature of the first circuit region.

12. The method of claim 11, further comprising:
selecting a first of the plurality of relationships between the temperature of the second circuit region and the temperature of the first circuit region when the input voltage to the battery pack charger is less than a first voltage value.

13. The method of claim 12, wherein the first of the plurality of relationships is a scalar value that is proportional to the input voltage.

14. The method of claim 13, further comprising:
selecting a second of the plurality of relationships between the temperature of the second circuit region and the temperature of the first circuit region when the input voltage to the battery pack charger is greater than or equal to the first voltage value.

15. A charging circuit for a battery pack charger, the charging circuit comprising:
a first circuit region including:
an isolation power supply, and
a power input circuit configured to:
receive a voltage from the isolation power supply, and
generate a direct current voltage signal; and
a second circuit region including:
a temperature measurement component configured to generate a signal related to a temperature of the second circuit region, and
a control circuit configured to:
receive the direct current voltage signal,
receive the signal related to the temperature of the second circuit region,
estimate a temperature of the first circuit region based on the direct current voltage signal and the signal related to the temperature of the second circuit region, and
control an operation associated with the battery pack charger based on the estimated temperature of the first circuit region.

16. The charging circuit of claim 15, wherein the first circuit region further includes a diode bridge.

17. The charging circuit of claim 15, wherein the isolation power supply includes a primary winding and a secondary winding.

18. The charging circuit of claim 17, wherein the power input circuit includes:
a diode connected to the secondary winding of the isolation power supply;
a filter capacitor connected to the diode; and
a voltage divider circuit connected to the diode and the filter capacitor.

19. The charging circuit of claim 18, wherein the voltage divider circuit includes a first resistor and a second resistor.

20. The charging circuit of claim 19, wherein the direct current voltage signal corresponds to a node between the first resistor and the second resistor.

\* \* \* \* \*